Patented May 8, 1945

2,375,623

UNITED STATES PATENT OFFICE 2,375,623

HALOGENATED HYDROCARBON COMPOSITIONS

Frank M. Clark, Pittsfield, Mass., assignor to General Electric Company, a corporation of New York No Drawing. Application July 29, 1942,
Serial No. 452,801

8 Claims. (Cl. 252—66)

The compositions constituting the present invention have flow points above room temperature and are particularly suited for use in the electrical field, for example, for filling and sealing potheads, cable joints, bushings and capacitors. Such compositions, which comprise a combination of halogenated hydrocarbons, are characterized by a combination of properties which peculiarly adapt them for electrical insulating purposes, such, for example, as high dielectric strength, non-inflammability and resistance to moisture. Such properties are accompanied by an unusual degree of tackiness or stickiness. The latter property results in a firm bond between such compositions and the surfaces of metal and insulating members of electrical devices. Such compositions also possess strong cohesiveness or clinging together which practically prevents the occurrence of voids during shrinkage and thus avoids harmful ionization which might occur in cracks or voids.

Compositions embodying my invention comprise as substantial ingredients chlorinated diphenyl benzene (also known as chlorinated triphenyl) and a material chosen from the class consisting of chlorinated diphenyl, chlorinated diphenyl methane and other chlorinated substitution products of diphenyl, diphenyl oxide and diphenylene oxide.

Separately these ingredients are unsuited for filling and sealing purposes. Chlorinated diphenyl benzene compounds unassociated with modifying materials and containing as high as about 48 per cent of chlorine, or more, are brittle, resinous solids which are not capable of adhering to smooth surfaces of metal or insulating materials, and which, when contracting during cooling, have voids and fissures formed therein. As a consequence, such highly chlorinated compositions are not water-resistant and are subject to internal ionization which leads cumulatively to physical and chemical deterioration and ultimate electrical breakdown.

While less brittleness is characteristic of chlorinated diphenyl benzene compositions having a lower chlorine content, such compositions flow at a temperature too low for commercial use under conditions requiring adhesiveness and flexibility, as in potheads and as sealing coatings. A filling or sealing composition should withstand temperatures of at least about 50° C., and preferably a higher temperature, without fusion. Chlorinated diphenyl benzenes containing about 48 per cent and upwards of chlorine possess a suitable rigidity or resistance to flow at 50° C. but are brittle, crack on cooling, and otherwise are unsuited for electrical or moisture proofing application as already described. The following table illustrates the change in physical nature and flow characteristic as the chlorination of the diphenyl benzene progresses.

| Degree of chlorination of diphenyl benzene | Per cent chlorine | Flow point, degrees C. | Condition at 25° C. |
|---|---|---|---|
| Monochlor | 13.2 | 100–125 | Soft, wax-like solid. |
| Dichlor | 23.5 | 24 | Viscous liquid. |
| Trichlor | 31.6 | 38 | Soft resin. |
| Tetrachlor | 38.2 | 45 | Do. |
| Pentachlor | 43.7 | 48 | Do. |
| Hexachlor | 48.2 | 64 | Brittle resin. |
| Heptachlor | 52 | 87 | Do. |
| Octachlor | 55.7 | 88 | Do. |
| Nonachlor | 58.7 | 90 | Do. |
| Decachlor | 61.5 | 93 | Do. |

The normally solid, highly chlorinated compositions of diphenyl or of its substitution products (that is, compounds containing at least about 50 per cent chlorine), such as diphenyl methane, diphenyl ketone, or diphenyl ethane, are subject to similar limitations.

The compositions embodying my invention comprise as substantial ingredients brittle, resinous or crystalline, highly chlorinated diphenyl benzene blended with a highly chlorinated diphenyl compound. Such blends are plastic and ordinarily are semi-solid. They do not become liquid when heated to a temperature of about 50° C. but are liquefied at moderately higher temperatures. The following examples will illustrate the nature of compositions embodying my invention.

*Example 1*

A composition comprising an intimate mixture or blend by weight of 56 parts of solid, rosin-like and brittle decachlor triphenyl (diphenyl benzene) (61.5% Cl) and 44 parts of pentachlor (54% Cl) diphenyl possesses the following properties:

Flow point _____ 55° C.
Viscosity at 100° C _____ 285 centipoise
Dielectric strength 1/16″ gap at 25° C_ 35 kilovolts
Dielectric constant (100° C.) _____ 3.5
Specific gravity (100° C.) _____ 1.535
Color _____ Lemon yellow This composition at room temperature is a semi-solid material of a plastic, tacky nature, free from all crystallinity. It adheres firmly to metals, porcelain, glass, mica, and various other insulating materials commonly used in electrical apparatus. While it will deform slowly under approximately 30 pounds of pressure, its high viscosity effectively prevents leakage through crevices or small orifices. When heated to elevated temperatures at least as high as 85° C., its viscosity rapidly decreases, thereby permitting it to be readily poured in the fabrication of devices in which it is to be used. At 100° C., the viscosity of this composition is about 285 centipoise. At 125° C., its viscosity is only 30 centipoise. The tackiness of this composition, which is in contrast with the physical properties of its components, endows this composition with the property of firmly adhering to metal surfaces. It has excellent resistance to water penetration and otherwise excellent physical and electrical properties for use as a sealing compound and for filling electrical devices, such as potheads, and some types of transformers.

*Example 2*

Another composition illustrative of my invention is one consisting of about 33 parts of brittle, rosin-like decachlor diphenyl benzene and 67 parts of chlorinated diphenyl containing about 60 per cent chlorine. At 25° C. hexachlor diphenyl may be designated as a soft resin or highly viscous liquid. It has a pour point of about 30° C. The blended composition of the above-mentioned ingredients is solid at 25° C. It has a pour point of about 50° C. This composition has a high degree of tackiness, adhering firmly to solid surfaces with which it is in contact. It will not pass through small orifices even at temperatures somewhat above its pour point. Similar to the composition described under the first example, the composition of this second example is characterized by the absence of voids, bubbles or fissures when in the solid state.

*Example 3*

A further embodiment of my invention is constituted by a composition comprising 60 parts of the brittle, rosin-like chlorinated diphenyl benzene containing 52 per cent chlorine and corresponding to the heptachlor product, and 40 parts of a semi-solid, chlor diphenyl methane containing about 57 per cent chlorine, corresponding to the hexachlor derivative. This composition has a pour point of 57° C., retains its tacky consistency at temperatures even below room temperature and within the range of normal commercial use. It is characterized by excellent resistance to water penetration and by freedom from void formation and cracking as the temperature changed over wide range. This material, like the compositions previously described, is characterized by a rapid drop in viscosity above its softening temperature. It can be poured easily into the most intricate spaces of an electrical device at temperatures not exceeding 100 to 125° C.

*Example 4*

Another illustration of my invention is constituted by compositions comprising chlorinated diphenylene oxide and chlorinated diphenyl benzene. Tetrachlor diphenylene oxide, which contains about 46 per cent chlorine, is a white solid melting at 80 to 90° C. It is characterized by good electrical properties. Its poor resistance to water penetration renders it unsuitable for use as a sealing and filling compound. When used as a dielectric impregnant, it must be protected from moisture effects. Surprisingly, the admixture with a normally brittle, heavily chlorinated diphenyl benzene of solid diphenylene oxide product results in a water-resistant, tacky composition quite unlike its components. A suitable blend comprises equal parts by weight of the decachlor diphenyl benzene and tetrachlor diphenylene oxide. This composition has a flow point of 75 to 80° C., is strongly adherent to metal surfaces, possesses a high degree of resistance to water penetration, and is otherwise suitable for use as a sealing and filling compound for electrical use.

*Example 5*

Still another illustration of compositions embodying the present invention is constituted by compositions containing highly chlorinated, glass-like diphenyl benzene, that is, a diphenyl benzene compound combined with about 60 per cent chlorine and solid, highly chlorinated diphenyl oxide which itself is a hard, brittle, crystalline material of poor waterproofing characteristics. Compositions consisting of a blend of these ingredients are non-brittle and possess good waterproofing properties. For some ranges of composition these new blends are soft, sticky, semi-solids useful in potheads, cable joints, bushings and the like. For example, a composition consisting of equal parts of hard, brittle chlorinated diphenyl benzene and hard, brittle chlorinated diphenyl oxide at 25° C. is a relatively soft, resinous solid. Whereas the melting point of chlorinated diphenyl benzene is about 95 to 105° C. and the melting point of the highly chlorinated diphenyl oxide is in the range of 131.5 to 137° C., the flow point of such an equal-parts mixture is about 50° C. The viscosity of such an equal-parts mixture at 110° C. is 343 Saybolt seconds and at 130° C. is 111 Saybolt seconds. The specific gravity at 100° C. (referred to water at 15.5° C.) is 1.576. At 130° C./15.5° C., the specific gravity is 1.555.

A mixture consisting of 75 parts by weight of highly chlorinated diphenyl benzene and 25 parts by weight of highly chlorinated diphenyl oxide is a soft, sticky, semi-solid having a flow point of about 78° C.

In my application Serial No. 452,802, filed concurrently herewith, are described and claimed various other compositions containing crystalline chlorinated diphenyl oxide.

Compositions embodying my invention are soluble in mineral oil, but, unlike the asphalt compositions heretofore used as sealing and filling compounds, do not result in harmful effects when dissolved in mineral oil or other liquid dielectric normally used in electrical apparatus. Such solutions are inert and do not cause increased dielectric loss, increased oxidation, sludge formation, or decreased dielectric strength. Asphaltic compounds, on the contrary, when dissolved in mineral oil, even in small amounts, cause increased dielectric loss, produce acceleration of oxidation of the oil, and promote the formation of sludge in such oil solution. Indeed, my improved sealing and filling compounds when present in mineral oil cause the formation of sludge in the oil to be somewhat retarded.

One of the useful applications of compositions embodying this invention is as a coating and sealing material for devices, such as capacitors, transformer coils and other assemblies in which cellulose insulation must be protected from water absorption. For example, a capacitor or other apparatus may be dipped into a molten composition of the type herein described in order to surround the capacitor with a moisture-excluding shell or skin. Alternatively, the sealing compositions may be applied by spraying either the heated composition on the parts to be coated or by spraying a solution in a volatile solvent, such as benzol or toluene. Such coatings are more effective than coatings of cellulosic lacquer and resin material in preventing the absorption of moisture by the coated device.

Still another application of my improved compositions involves their use as a film to prevent rust formation on oxidizable metals during storage. It is customary to protect such metals by a coating of inert material, for example, mineral oil, on the metal surface. This is time consuming and in some instances costly, and in the case of mineral oil collects dust and dirt which are imparted to the dielectric liquid in which the metal parts are later immersed. My improved compositions may be sprayed as a solution in a volatile solvent on such surfaces. When the solvent is removed by air drying or baking, an enamel-like waterproof film remains which is firmly adherent to the metal surface. Such film thoroughly prevents oxidation and rust formation of the metal without collecting impurities. When later immersed in mineral oil or other dielectric liquid, the film is removed by solution in the oil which is unimpaired by its presence. On metallic surfaces making electrical contact—as in a switch—this is of value, since it leaves the contacting surface clean and highly conductive.

*Example 6*

Such a coating composition may comprise a blend containing 95 per cent decachlor diphenyl benzene and 5 per cent chlor diphenyl containing 60 per cent chlorine. This blend has a flow point of 90° C. and possesses a glossy, hard, enamel-like surface to which dust does not adhere. This composition, despite its hard, enamel-like finish, has sufficient tackiness to adhere firmly to metal surface. Its yieldability enables it to resist abrasion or breakage under sharp mechanical shock.

While my invention has been described particularly with reference to chlorinated compounds, the employment of other halogens is not precluded. In general, chlorinated compounds are preferred.

What I claim as new and desire to secure by Letters Patent of the United States is:

1. Solid, highly adhesive compositions having flow points ranging from about 50° C. to 55° C. and consisting by weight of substantially 33 to 56 per cent of decachlor diphenyl benzene and 67 to 44 per cent of chlorinated diphenyl containing about 54 to 60 per cent chlorine.

2. Stable compositions having flow points materially above 25° C. which are characterized by a high dielectric strength and resistance to moisture, comprising at least about one-third by weight chlorinated diphenyl benzene containing between about 52 and 61.5 per cent chlorine and a chlorinated material chosen from the class consisting of diphenyl, substitution products of diphenyl, diphenyl oxide and diphenylene oxide, said latter material containing at least about 48 per cent of chlorine.

3. A non-crystalline, semi-solid, sticky material having flow points in the range of about 50 to 90° C. having high viscosity at ordinary temperatures and a sufficiently low viscosity to be pourable only at a temperature as high as about 100° C., comprising about 33 to 95 parts of chlorinated diphenyl benzene containing at least about 48 per cent chlorine and about 67 to 5 parts of chlorinated material chosen from the class consisting of diphenyl, substitution products of diphenyl and diphenylene oxide, said latter material containing at least about 46 per cent chlorine.

4. A composition suitable for the electrical insulation field comprising a mixture of decachlor diphenyl benzene, containing about 61 per cent chlorine, and chlorinated diphenyl containing not less than 54 and not more than 60 per cent chlorine, said composition at room temperature being a plastic, tacky, semi-solid material and having a flow point of about 55° C.

5. Compositions suitable for dielectric and insulating purposes having flow points above 25° C. comprising by weight about 40 to 70 parts diphenyl benzene which is combined with at least about 52 and not more than 61.5 per cent chlorine and about 60 to 30 parts diphenyl which is combined with at least about 54 per cent chlorine.

6. Compositions having flow points within the range of about 75 to 80° C. which are adapted for use in electrical devices and comprise blends in substantial proportions of tetrachlor diphenylene oxide and decachlor diphenyl benzene, said compositions being water-resistant and strongly adherent to metal surfaces.

7. Semi-solid compositions which are adapted for use in electrical devices and comprise blends in substantial proportions of solid, brittle, decachlor diphenyl benzene containing at least about 60 per cent chlorine and solid, brittle, chlorinated diphenyl oxide containing about 60 per cent chlorine, said compositions having flow points within a range of about 50 to 90° C.

8. Non-crystalline, semi-solid plastic compositions having flow points in the range of about 50 to 78° C. consisting of blends of 50 to 75 parts by weight of normally brittle chlorinated diphenyl benzene containing about 60 per cent chlorine and 50 to 25 parts of normally brittle chlorinated diphenyl oxide containing between about 60 and 61.5 per cent chlorine, said compositions being water-resistant and having a high degree of adhesiveness to solid surfaces.

FRANK M. CLARK.